(12) United States Patent
Hupkes et al.

(10) Patent No.: US 7,359,830 B2
(45) Date of Patent: Apr. 15, 2008

(54) METHOD FOR AUTOMATIC ON-LINE CALIBRATION OF A PROCESS MODEL

(75) Inventors: Wim Hupkes, Amsterdam (NL); Frederic Viel, Amsterdam (NL)

(73) Assignee: Shell Oil Company, Houston, TX (US)

(*) Notice: Subject to any disclaimer, the term of this patent is extended or adjusted under 35 U.S.C. 154(b) by 129 days.

(21) Appl. No.: 10/333,446

(22) PCT Filed: Jul. 17, 2001

(86) PCT No.: PCT/EP01/08288

§ 371 (c)(1),
(2), (4) Date: Jan. 21, 2003

(87) PCT Pub. No.: WO02/06905

PCT Pub. Date: Jan. 24, 2002

(65) Prior Publication Data

US 2003/0158680 A1     Aug. 21, 2003

(30) Foreign Application Priority Data

Jul. 19, 2000   (EP) ................................ 00306148

(51) Int. Cl.
*G06F 19/00*   (2006.01)
*G06F 17/40*   (2006.01)

(52) U.S. Cl. ..................... 702/182; 702/85; 702/81; 702/84; 700/109; 703/6

(58) Field of Classification Search ............ 700/29–32, 700/47–50; 702/85–87, 89, 106, 109, 182, 702/189, 193, 22, 81–84, 179–181, 183, 702/185, 187, 188, 190, 29–32, 47–50; 703/2

See application file for complete search history.

(56) References Cited

U.S. PATENT DOCUMENTS 4,771,389 A * 9/1988 Takahashi et al. .......... 700/250

(Continued)

FOREIGN PATENT DOCUMENTS

EP   0 285 251   10/1988

OTHER PUBLICATIONS

"Stochastic Processes and Filtering Theory" by Jazwinski (Academic Press, Mathematics and Science and Engineering, vol. 64, 1970).

(Continued)

*Primary Examiner*—Hal Wachsman
(74) *Attorney, Agent, or Firm*—William E. Hickman

(57) ABSTRACT

A method is disclosed for collecting and processing raw process data. The method includes processing the raw data through a process model to obtain a prediction of the process quality; processing this prediction through two dynamic transfer functions thus creating two intermediate signals; storing the two intermediate signals as a function of time; retrieving at the time of a real and validated measurement of the process quality from the history the absolute minimum value and maximum value of the two intermediate signals in the time period corresponding to a minimum and maximum specified deadtime, in which the absolute minimum value and maximum values define the minimum and maximum prediction possible; calculating the deviation as being the difference between the real and validated measurement and the uncertainty area encompassed between the minimum and maximum prediction possible; incorporating the deviation into the process model to calibrate the process model; and, repeating.

7 Claims, 4 Drawing Sheets

U.S. PATENT DOCUMENTS

| | | | | |
|---|---|---|---|---|
| 5,282,261 | A | * | 1/1994 | Skeirik ........................ 706/23 |
| 5,646,870 | A | | 7/1997 | Krivokapic et al. |
| 5,655,110 | A | | 8/1997 | Krivokapic et al. |
| 5,687,077 | A | * | 11/1997 | Gough, Jr. ................... 700/29 |
| 5,814,783 | A | * | 9/1998 | Harville et al. ............. 219/110 |
| 5,859,964 | A | * | 1/1999 | Wang et al. ................... 714/48 |
| 5,884,685 | A | | 3/1999 | Umezawa et al. .......... 164/453 |
| 5,918,191 | A | | 6/1999 | Patel ........................... 702/84 |
| 5,949,678 | A | * | 9/1999 | Wold et al. ................... 700/83 |
| 6,487,459 | B1 | | 11/2002 | Martin et al. ................. 700/44 |
| 6,532,428 | B1 | | 3/2003 | Toprac ........................ 702/97 |
| 6,635,224 | B1 | | 10/2003 | Gui et al. ..................... 422/62 |
| 2001/0005821 | A1 | * | 6/2001 | Ottosson ..................... 702/185 |
| 2002/0019722 | A1 | * | 2/2002 | Hupkes et al. .............. 702/181 |
| 2003/0158680 | A1 | | 8/2003 | Hupkes et al. ................ 702/85 |

OTHER PUBLICATIONS

T. Poggio and F. Girosi. Network for approximation and learning. The Proceedings of the IEEE, 78(9):1485-1497, Sep. 1990.

Z. Trajanoski, et al. "Simulation Studies on Neural Predictive Control of Glucose Using the Subcutaneous Route", Computer Methods and Programs in Biomedicine 56 (1998) 133-139.

"Rugged Calibraction for Process Control," P. J. Gemperline, Company 95', Oct. 1995, pp. 1-22.

"Using Qualitative Observations for Process Tuning and Control," C. J. Spanos et al. IEEE Transactions on Semiconductor Manufacturing, Apr. 1998, pp. 1-40.

"Mudcats Metrology Suite," Technical Documentation, Edison ESI, 2002, 7 pages.

"The 811 Online IC defince new standars in process analysis" Metrohm Information, pp. 8-10, Issue Feb. 2001, Feb. 2001.

Douglas C. Montgomery and Elizabeth A. Peck, "Introduction to Linear Regression Analysis", John Wiley & Sons, 1992, pp. 1-6.

Thomas Kailath, "Linear Systems", Prentic-Hall, Inc., 1980, pp. 1-26.

Torsten Soderstrom and Petre Stoica., "System Identification - Linear Regression", Prentice Hall, pp. 60-64.

* cited by examiner

METHOD FOR AUTOMATIC ON-LINE CALIBRATION OF A PROCESS MODEL

CROSS REFERENCE TO PRIOR APPLICATION

This application claims priority to European Patent Application No. 00306148.8 filed on Jul. 19, 2000.

1. Field of the Invention

The present invention relates to an automatic on-line calibration of input/output models.

2. Background of the Invention

It is known in process control systems to use one or more so-called Quality Estimators (herein after referred to as QE) in the real time prediction of certain, preferably, key process quality and/or property parameters (normally referred to as outputs) from readily available raw process measurements (normally referred to as inputs). Thus, QE is in essence a mathematical input/output process designed to predict relevant process values.

QE's are usually identified from collected process data. In order to have a useful meaning in real time implementation, a QE has to be calibrated using historic quality measurements, which can be taken on-line or off-line depending on the type of process and/or the type of measurement envisaged, so as to minimise, or preferably avoid, any drift in the predicted quality. QE's are preferably used in situations which allow rather infrequent and/or delayed measurements of product quality. This may be the case when, for instance, the amount of time needed to produce the measured value is rather long or when the method is relatively costly.

There are a number of difficulties to be faced in the process of automatic on-line calibration of QE such as the occurrence of varying or uncertain process/measurement deadtimes and dynamics between the QE inputs and the measured qualities as well as a phenomenon normally referred to as changing of the process gains, i.e. a drift in the ratio between inputs and outputs.

In order to combat these unwanted situations, it is customary to calibrate QE when the process for which they are applicable is in its so-called steady-state, i.e. in the situation in which the process fluid is uniform and constant in composition, state and velocity at the entrance and at the exit of the operation. Although such calibration will give good results with respect to the system to be monitored, it is still considered to be sub-optimal as dynamic information available is not used. This is because calibration has to wait until the process has reached a steady operating point. Moreover the presence of a steady-state detector is required in order to know when calibration can start.

SUMMARY OF THE INVENTION

The process of the present invention allows for a real time method for automatic on-line calibration in a robust manner. The Robust Quality Estimator (RQE) according to the present invention provides a more accurate and robust quality prediction, which improves the performance of any quality control scheme in which it is applied. For instance, it improves the performance of a linear model predictive controller when the process is such that the steady-state gains and/or the dynamics (such as the deadtime) between the manipulated variables and the controlled quality are varying in an unpredictable manner within certain identified boundaries. Moreover, it can also be used to facilitate closed-loop control of any process variable with a difficult dynamic behaviour.

The present invention therefore relates to a method for automatic on-line calibration of a process model for real-time prediction of process quality from raw process measurements which method comprises:
a) collecting raw process data,
b) processing data collected in step a) through the process model to obtain a prediction of the quality,
c) processing this prediction through dynamic transfer functions thus creating two intermediate signals,
d) storing the two intermediate signals obtained in step c) as a function of time in history,
e) retrieving at the time of a real and validated measurement of the quality from the history the absolute minimum and maximum value of the two intermediate signals in the time period corresponding to a minimum and maximum specified deadtime, which values define the minimum and maximum prediction possible,
f) calculating the deviation as being the difference between the real and validated measurement and the area encompassed between the minimum and maximum prediction possible as obtained in step e),
g) proceeding with step i) if the absolute value of the deviation obtained in step f) is zero, or, proceeding with step h) if the absolute value of the deviation obtained in step f) is larger than zero,
h) incorporating the deviation into the process model, and
i) repeating steps a)–h).

The process model, which is calibrated with the method of the present invention, is suitably a so-called input-output parametric model, which has been obtained off-line from history process data and quality measurement. Examples of such models are Multiple Linear Regression as described in for example, Introduction to linear regression analysis by Montgomery and Peck, John Wiley & Sons, 1992, Linear Dynamic Model (in the Laplace transform Domain) as for example described in Linear Systems by Keilath, Prentice-Hall, Information & System sciences series, 1980 and Radial Bias Function Neural Network (optionally with Gaussian function) as for example described in T. Poggio and F. Girosi. Network for approximation and learning. The Proceedings of the IEEE, 78(9):1485–1497, September 1990. Depending on the nature of the process model applied and the type of raw material data received, those skilled in the art will select the type of process model for the quality estimation best fitting the perceived goal.

Use shall be made of the following Figures to illustrate the method of the present invention more clearly.

BRIEF DESCRIPTION OF THE DRAWINGS

The invention will now be illustrated in more detail with reference to the accompanying drawings, in which should not be constructed to limit the scope of the invention.

DETAILED DESCRIPTION OF THE INVENTION

Figure 1:
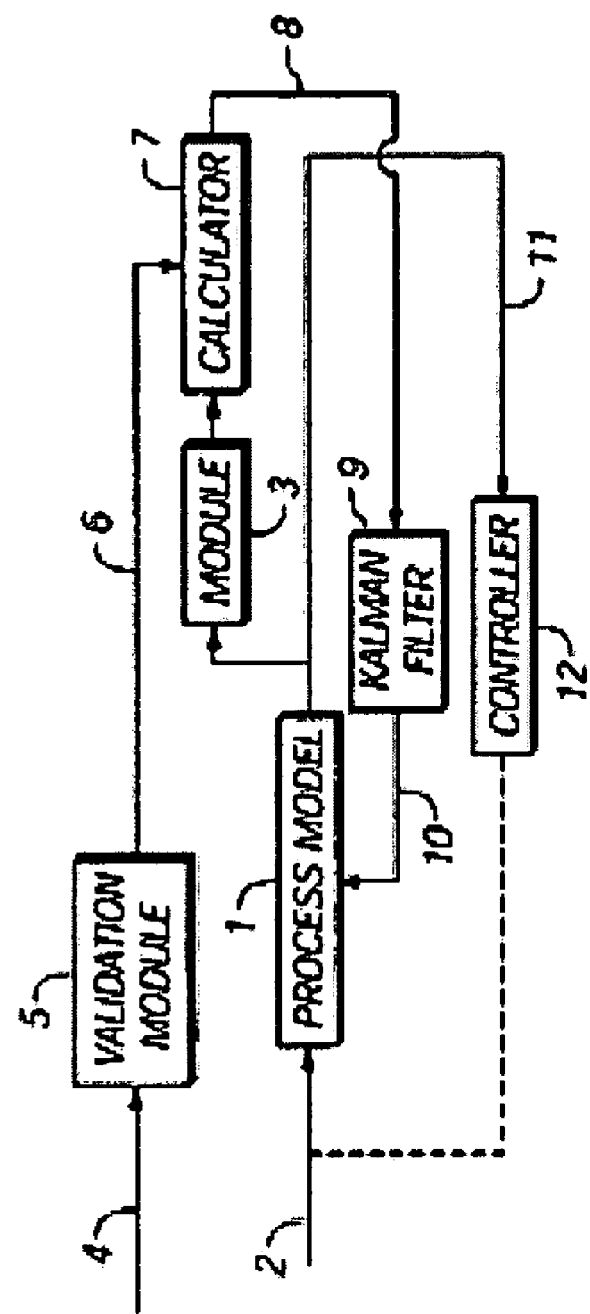
FIG. 1 is a functional block-scheme illustrating a preferred embodiment of the method of the present invention.

FIG. 1 shows a process model (1) having input from raw process data (2). The process model (1) provides an estimated quality (11), which is used as input for controller (12), which may control for example a valve (not shown). FIG. 1 also shows a module (3) wherein steps (c) and (d) are performed. Further shown is a validation module (5), which validates the real quality measurement (4) to obtain a real and validated quality measurement (6). Based on the input from module (3) and the real and validated quality measurement (6) a deviation is calculated in (7). If the deviation is greater than zero as described in step (g) the deviation (8) is used for calibration of the process model (1), preferably by making use of the Kalman Filter (9).

The collection of raw process data (2) in step (a) to be used in the method according to the present invention can be carried out by methods known in the art. It is customary in process control technology to measure data (2) at a number of points over a period of time. For instance, in refining operations, operating parameters such as temperature, pressure and flow are normally measured at frequent intervals, or even in a continuous manner and they can be stored and processed in many ways as is known to those skilled in the art.

In order to get a prediction of the quality (11) out of the raw process data (2) collected from the above referred to process model (1) will be used in step (b). Step (b) is thus the quality prediction step.

Step (c) is an essential step in the method for automatic on-line calibration. This and further steps will also be illustrated by making use of FIG. 2. In these steps the calculation of the minimum and maximum prediction possible at the time of the real and validated measurement(s) of the quality is performed. Step (c) is suitably performed by applying two dynamic transfer functions (so-called uncertain dynamics) to the prediction of the quality (11) (the undelayed real time), thus creating two intermediate signals. Suitably two or more independent dynamic transfer functions are applied. Dynamic transfer functions are well known tools to one skilled in the art and are for example described in Linear Systems by Keilath, Prentice-Hall, Information & System sciences series, 1980. In step (d) these intermediate signals (20, 21) are stored as a function of time in history. This will result in essence in an (uncertainty) area (22) in which the actual process response should be placed and which will become very narrow when reaching the steady-state situation (23, 24). It is also possible that the uncertainty area (22), in a non-steady state situation, is reduced to a line corresponding to the event in which the independent dynamic transfer functions are identical (this situation is not shown in FIG. 2). The so-called minimum and maximum prediction possible are obtained by calculating from the history the absolute minimum (27) and maximum values (28) of these two intermediate signals (20, 21) in the time period corresponding to a minimum (25) and maximum (26) specified deadtime. The deadtime is a function of the virtual location of the quality estimator relative to the location where the real quality is measured, time for the real quality to be measured and other process conditions, for example flow rate and liquid hold-up. The deadtime can be easily determined by one skilled in the art. From this input a maximum (26) and minimum (25) deadtime is defined representing the time period of the process history in which in step (f) the real and validated quality measurement (29→29) is compared with the predicted quality area (22) and the specific minimum (27) and maximum (28) possible quality values.

Before reaching the steady-state situation, the area (22) can be very wide. State of the art systems will either only calibrate during steady-state or have the risk of making a false calibration in case the real and validated measurement(s) of the quality is within the above mentioned area. The method according to the present invention, however, is specifically designed to calibrate only when the real and validated measurement(s) (29) of the quality are outside the uncertainty area (22), thus preventing instabilities in closed-loops. The calibration method according to the present invention can be performed under steady and non-steady state conditions.

In step (e) in the method according to the present invention part of the calibration process is carried out by calculating the deviation (30) (the so-called prediction error) as being the distance or the difference between the real and validated measurement (29) and the area (22) encompassed between the minimum (27) and maximum (28) prediction possible as obtained from the earlier calculation, or, alternatively, the difference between the real and validated measurement (29) and the maximum (28) prediction possible as obtained from the earlier calculation.

The real and later validated measurement (29) of the quality can be an on-line or off-line measurement of the quality. The quality to be measured can be properties of process streams or products, such as, viscosity, viscosity index, vapor pressure, boiling points, free and cloud points, density, octane number and cetane number; and, compositional information such as sulphur content, aromatics content, benzene content and olefin content can also be measured at frequent intervals or even in a continuous manner by making use of off-line or on-line analytical apparatuses. Such apparatuses may measure the property directly making use of for example on-line viscometric analysers, GLC or NMR analysers. The quality may also be measured indirectly by making use of near infrared prediction methods as for example described in EP-A-285251 for measuring octane number.

Figure 2:
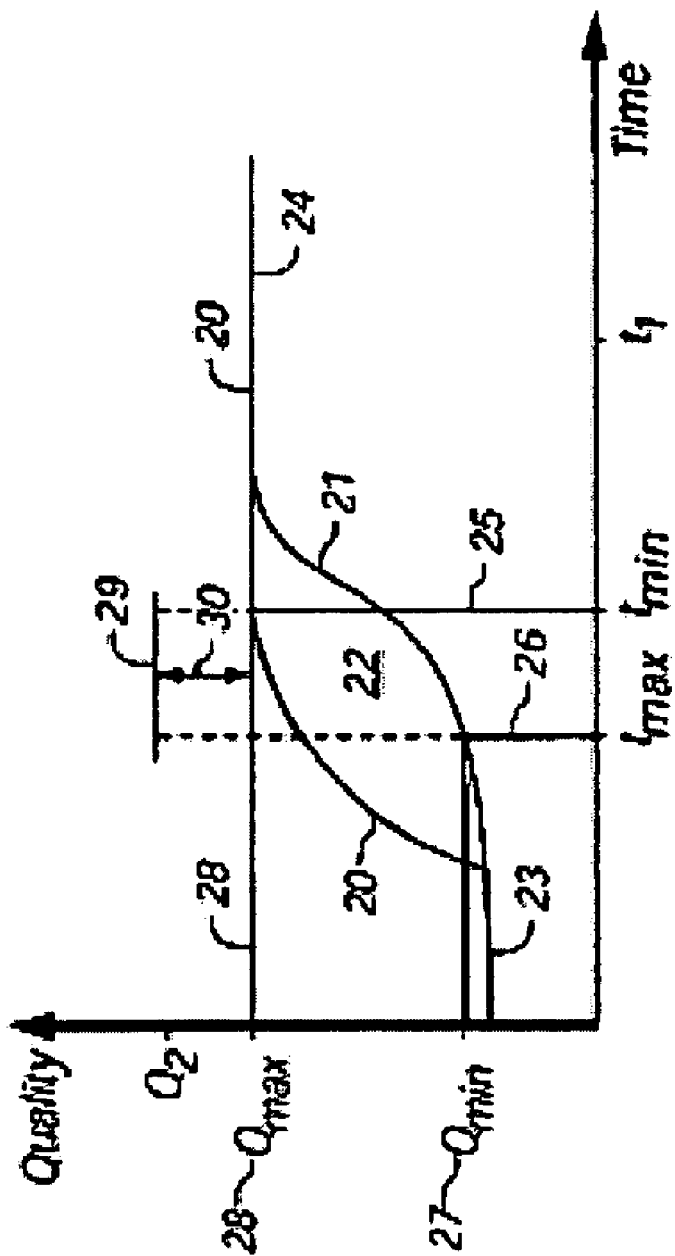
FIG. 2 is a graph illustrating different terms of the method of the present invention.

In step (g) the usefulness for calibration purposes of the real and validated measurement of the quality is determined. Only measurements (29') of the quality, which are outside the uncertainty area (22), can be used for calibration of the model. In other words, if the calculation of the deviation (30) as described herein above shows that the absolute value of the deviation obtained is zero, meaning that the validated and real measurement of the quality is within the uncertainty area (22) or more precise, between the minimum (27) and maximum (28) possible quality values, the deviation (30) found will not be used as further input in the calibration process but the system will continue by repeating the steps carried out up till now as there is no need to refine the system. If, however, the deviation (30) as calculated shows that the absolute value of the deviation (30) is larger than zero, as shown in FIG. 2, the deviation (30) obtained will be incorporated into the process model in step (h) and the previous steps will be repeated (step i). The net result will be the generation of a modified, more precise, predictive process model, which will then serve as the basis for further modifications depending on the level of deviations being observed during the course of the calibrating process.

Preferably step (h) is performed, such that incorporation of the deviation (8) into the process model (1) is performed with the use of a Kalman filter (9) (See FIG. 1). The result of performing step (h) in such a manner will be that the deviation can be incorporated into the process model by adjusting its linear parameters thereby updating the prediction band and improving the process model. The use of a Kalman filter is well known in the art of process control operations. Reference is made in this respect to "Stochastic Processes and Filtering Theory" by Jazwinski (Academic Press, Mathematics and Science and Engineering, Vol. 64, 1970). Since Kalman filters are in essence optimal stochastic filters they also filter out, or even eliminate, the noise on the measured quality, which makes them very suitable for use in the method according to the present invention.

It should be noted that the use of Kalman filters is not limited to calibration operations, which are carried out under non steady-state conditions, as it is equally capable of providing useful information when a process is being operated under steady-state conditions.

It has been found that by combining the Kalman filter with the process according to the present invention an even more robust control method is obtained. The use of the Kalman filter has the additional advantage that it will keep improving the accuracy of the quality estimation process. In the event that no real and validated measurement of the quality is received, calibration as defined in steps e, f and g is not carried out. The system will repeat steps a-d until a further real and validated measurement of the quality is received.

The calibration process as described in the present invention can be extrapolated for robust multivariable predictive controllers to cover uncertain dynamics in the control model for all the transfer functions between the manipulated variables and the controlled variables.

A further advantage of the present method is that as a by-product of the calibration process (the steps described above) performed by the method of the present invention, the real time accuracy of the prediction is exactly known at any time (via the calculated prediction error or deviation (30)). This avoids costly and extensive quality measurement campaign for validation purpose as required with conventional Quality Estimators.

Examples of applications for the present invention are:

Distillation processes, wherein the quality to be estimated by the quality estimator is for example the quality of composition, viscosity, density or boiling point, of the fractions obtained in the distillation. The raw process data as collected in step (a) may be the flow rates, feed and product temperature, tray temperatures, overhead temperatures, system temperatures, reflux ratio, circulation reflux duty and the reboiler duty. Exemplary distillation processes are crude distillers, vacuum distillers, light ends splitters as for example de-ethanisers, de-propanisers, de-butanisers, ethane-ethane splitters, propene-propane splitters, butene-butane splitters.

Conversion processes, wherein the quality to be estimated by the quality estimator is for example the quality of composition or yield, viscosity, density, boiling point, octane number, cetane number, melt index of the product as obtained in the conversion. The raw process data as collected in step (a) may be the flow rates, feed composition, density, catalyst age, or temperatures. Exemplary conversion processes are polymerisation processes, hydrocracking, fluid catalytic cracking, hydrotreating, hydrogenation, hydrodesulphurisation, (hydro)dewaxing, hydroisomerisation, reforming or delayed coking.

Blending processes, wherein the quality to be estimated by the quality estimator may be the octane number or cetane number, viscosity, viscosity index, boiling point or composition. The raw process data as collected in step (a) may be temperatures of the different feed streams or compositional data of the buffer tanks upstream.

Figure 3:
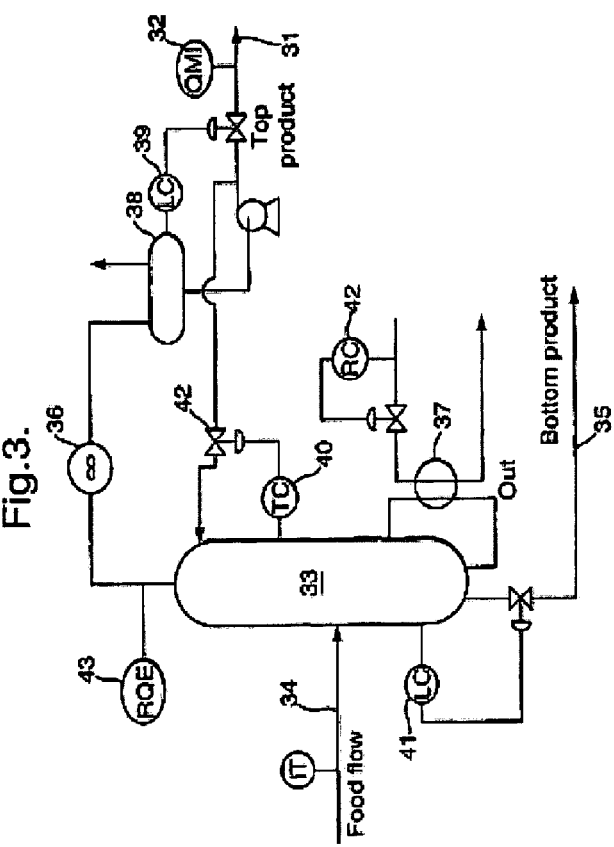
FIG. 3 is a simplified flow chart of a distillation column being controlled by means of a quality estimator.

The application and advantages of the Robust Quality Estimator according to the present invention is illustrated by the following more detailed description of a control of a simple two-cut splitter as shown in FIG. 3. This Figure shows a schematic representation of a distillation column (33) provided with a feed (34) and top product outlet conduit (31) and bottom outlet conduit (35). The unit is further equipped with a condenser (36), a overhead drum (38) and a reboiler (37). Various controls are present: a level control (39), a top temperature control (40), a level control (41) and a reboil control (42). The real quality of the top product (31) is measured by a continuous analyzer (32). This quality can be for instance a final boiling point or impurity content (amount of heavy product in the top product).

Such a distillation process will act as follows on for example a step test on the top temperature by changing the set point of the top temperature controller (40) acting on the reflux valve (42). The quality measured by the analyzer (32) will exhibit some first order dynamics with deadtime. The deadtime originates from transportation from the top of column (33) to the analyzer sampling point (32). This deadtime depends on how much product is made and will vary accordingly (resulting in an uncertain deadtime phenomenon). If now we look at the dynamic response, slow dynamics will occur in case the liquid hold-up of the overhead drum (38) is small (corresponding to a low level) and vice versa (resulting in an uncertain dynamics phenomenon). The dynamic response including the deadtime will thus be influenced by the level controller LC (39) on the overhead drum (38). From the above, the minimum and maximum deadtime can be determined.

Figure 4:
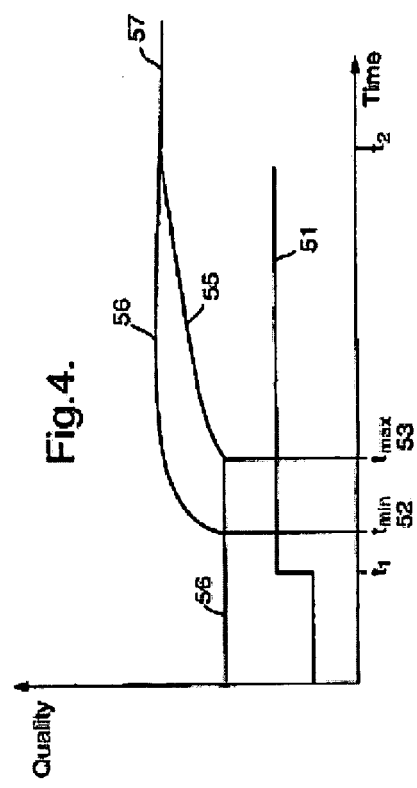
FIG. 4 shows the dynamic response of the minimum and maximum value of the expected quality after a step change of the set point of the process is performed.

FIG. 4 shows possible responses to this test step on the top temperature controller (40). On the y-axis the quality as measured by analyzer (32) is projected. On the x-axis time is projected. On time (t1) the temperature step is performed as shown by line (51). Between a minimum (52) deadtime and a maximum (53) deadtime the quality as measured at (32) will start to change from steady state quality (56) to a next steady state quality (57). Between steady state quality measurement (56) and (57) the quality as measured at (32) can vary between the minimum (55) and maximum (56) quality prediction possible. In a situation as shown in FIG. 4 and irrespective of the type of controller type (e.g. a model predictive controller), it will be very tough for the controller to achieve tight quality control when the controlled variable is the measured quality from the analyzer (32). This is because of the varying deadtime and uncertain dynamics between the top temperature and the quality measured by the analyzer as explained above and shown in FIG. 4.

The above disadvantage is overcome by estimating the quality at the top section of the column with the Robust Quality Estimator (RQE) (43 in FIG. 3) which is calibrated on-line according to the method of the present invention. The predictive process model of this RQE is using raw process measurements such as key temperatures in the column, pressures and flow rates. By controlling the process based on the quality estimated by the virtual analyzer (RQE) (43) instead of the real analyzer all tough phenomena, such as varying deadtime/dynamics due to the location of the sampling point and/or phenomena such as varying gain due to change in operating point, have been removed from the control loop. The real-analyzer (32) in its turn provides the real and later validated measurement for robust calibration of the predictive process model according to the present invention. Thus the RQE (43) will provide the controller with an early and accurate prediction of the product quality.

The above method has been applied in practice to a commercial benzene-toluene splitter. In this distillation unit benzene and toluene are recovered from an extract by means of distillation. The production objective is to maintain the amount of toluene impurity in the benzene below some upper limit. When this upper limit is exceeded, the product must be re-processed leading to a reduction in production capacity. The commercial toluene/benzene splitter was known to be a difficult column to control. The column had a non-linear response. An on-line analyzer such as showed in FIG. 3 measured the top product quality. Typically, the continuous analyzer took several minutes to detect changes in the quality of the product. The response time of this analyzer was also dependent upon the production rate through the column. This meant that the analyzer was slower to reflect changes in product quality during lower production rates. The original Multivariable Predictive Controller (MPC) was not robust against large changes in dead time and process non-linearities.

Figure 5:
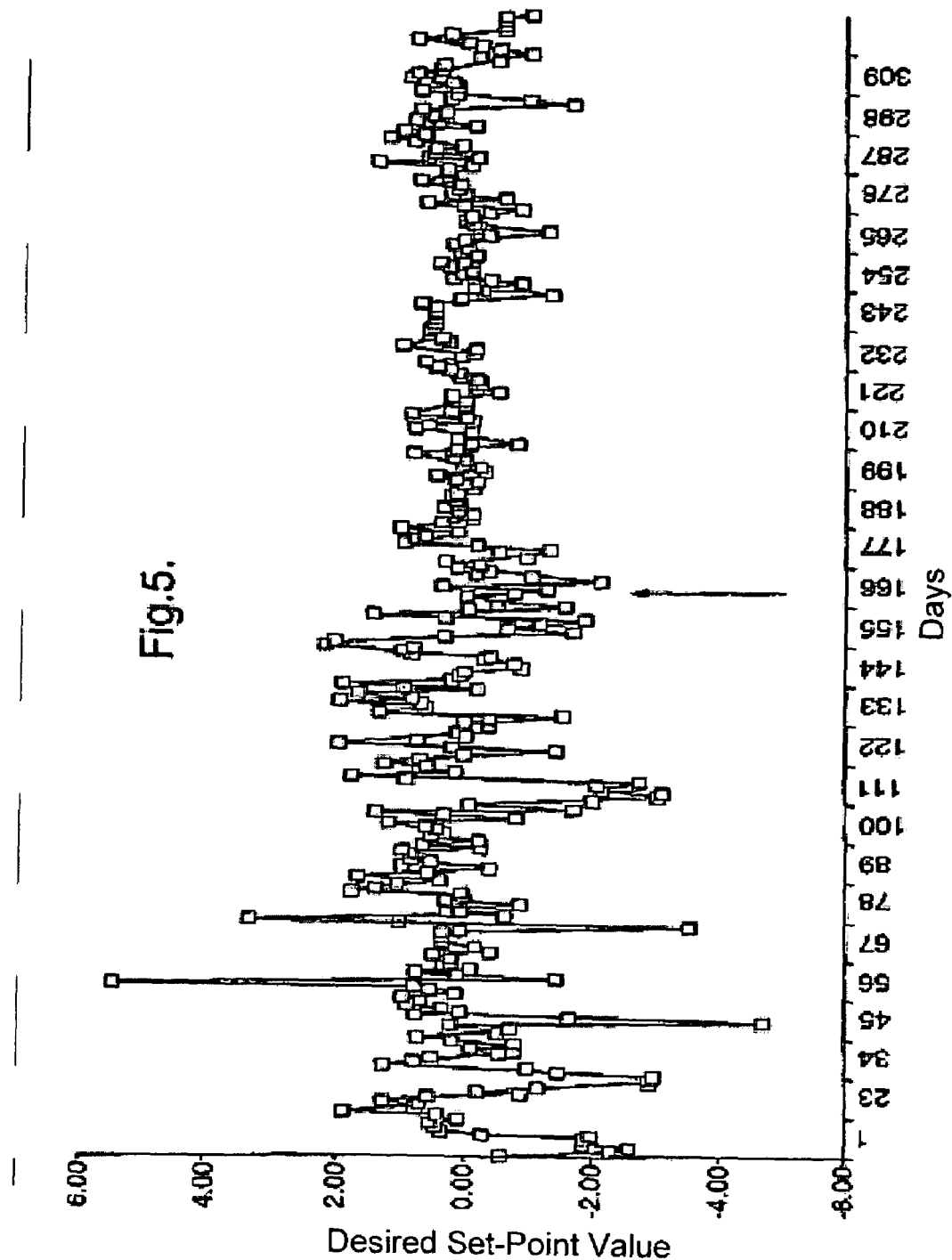
FIG. 5 illustrates the improved distillation operation before and after an on-line quality estimator is incorporated in the control loop.

The MPC controller was subsequently modified to control the predictive quality, i.e. the virtual analyzer or analyzer predictor (43) instead of the real analyzer (32)(see FIG. 3). The RQE allows for an early prediction of the Benzene quality without having to wait for the transportation delay in the overhead line as well as the measurement delay due to the analyzer itself. The RQE was periodically calibrated according to the present invention from the on-line analyzer measurement to adjust to any process non-linearity/disturbance. FIG. 5 indicates the improvement in performance—tighter control—after RQE was incorporated in the control loop at day "155". On the y-axis the zero value refers to the desired or set-point value. The variation on the y-axis is the normalized variation of the analyzer (32) output. FIG. 5 clearly shows that the variation when the control was performed on the quality (32) alone was much greater than after day "155", when the RQE (43) was used to control the quality of product (31). In hard figures the Aromatics plant had been producing approximately 640 t/d (200 ktpa) of Benzene. The plant now has a capability to produce at least 850 t/d (287 ktpa) after incorporating the RQE into the control loop.

In the claims:

1. A method for automatic on-line calibration of a process model for real-time prediction of process quality from raw process measurements which method comprises:
   a) collecting raw process data;
   b) processing data collected in step a) through the process model to obtain a prediction of the process quality;
   c) processing this prediction through two dynamic transfer functions thus creating two intermediate signals;
   d) storing the two intermediate signals obtained in step c) as a function of time;
   e) retrieving at the time of a real and validated measurement of the process quality from the history the absolute minimum value and maximum value of the two intermediate signals in the time period corresponding to a minimum and maximum specified deadtime, in which the absolute minimum value and maximum value define the minimum and maximum prediction possible;
   f) calculating the deviation as being the difference between the real and validated measurement and the uncertainty area encompassed between the minimum and maximum prediction possible as obtained in step e);
   g) proceeding with step i) if the absolute value of the deviation obtained in step f) is zero, or, proceeding with step h) if the absolute value of the deviation obtained in step f) is larger than zero;
   h) incorporating the deviation into the process model to calibrate the process model; and,
   i) starting over at step a).

2. The method of claim 1, in which a Multiple Linear Regression process model is used.

3. The method of claim 1, in which a Linear Dynamic process model is used.

4. The method of claim 1, in which a Radial Basis Function Neural Network process model is used.

5. The method of claim 1, in which in step h) a Kalman filter method is used to incorporate the deviation into the process model by adjusting the process model's linear parameters thereby upgrading the prediction and improving the process model by self learning.

6. The method of claim 5, in which the Kalman filter is used in step h) under non steady-state conditions of the process.

7. The method of claim 1, wherein the prediction in step (c) is processed through two independent dynamic transfer functions.

* * * * *